(12) United States Patent
Bartley et al.

(10) Patent No.: US 7,650,455 B2
(45) Date of Patent: Jan. 19, 2010

(54) SPIDER WEB INTERCONNECT TOPOLOGY UTILIZING MULTIPLE PORT CONNECTION

(75) Inventors: Gerald K. Bartley, Rochester, MN (US); Darryl J. Becker, Rochester, MN (US); John M. Borkenhagen, Rochester, MN (US); Paul E. Dahlen, Rochester, MN (US); Philip R. Germann, Oronoco, MN (US); William P. Hovis, Rochester, MN (US); Mark O. Maxson, Mantorville, MN (US)

(73) Assignee: International Business Machines Corporation, Armonk, NY (US)

( * ) Notice: Subject to any disclaimer, the term of this patent is extended or adjusted under 35 U.S.C. 154(b) by 101 days.

(21) Appl. No.: 11/829,250

(22) Filed: Jul. 27, 2007

(65) Prior Publication Data

US 2009/0031067 A1    Jan. 29, 2009

(51) Int. Cl.
*G06F 13/00* (2006.01)

(52) U.S. Cl. ........................ 710/316; 711/110

(58) Field of Classification Search .............. 710/316, 710/31; 711/109–110; 398/59
See application file for complete search history.

(56) References Cited

U.S. PATENT DOCUMENTS

| 4,193,121 A * | 3/1980 | Fedida et al. ............... 711/110 |
| 6,278,646 B1 * | 8/2001 | Mobley .................. 365/230.03 |
| 2008/0131122 A1 * | 6/2008 | Reisslein et al. .............. 398/59 |

* cited by examiner

*Primary Examiner*—Clifford H Knoll
(74) *Attorney, Agent, or Firm*—Bockhop & Associates LLC

(57) ABSTRACT

A data communications apparatus includes a central device and a plurality of communication devices. The central device includes a plurality of central port pairs, in which each central port pair includes an input port and an output port. The plurality of communication devices is arranged in a spoke and ring configuration, in which each communication device is part of a communication spoke. Each communication spoke is in communication with a different central port pair. Each communication device is also a part of a communication ring, so that each communication device in a selected communication ring belongs to a different communication spoke.

18 Claims, 3 Drawing Sheets

SPIDER WEB INTERCONNECT TOPOLOGY UTILIZING MULTIPLE PORT CONNECTION

BACKGROUND OF THE INVENTION

1. Field of the Invention

The present invention relates to computer systems and, more specifically, to a computer system in which a root device communicates with a plurality of other devices.

2. Description of the Prior Art

In computer systems, increasing processor performance is driving the need for higher bandwidth on input-output (I/O) interfaces, memory interfaces and inter-processor interconnects. Generally, these interfaces are changing from multi-drop bidirectional parallel busses to point-to-point high speed unidirectional serial busses. The higher frequencies required to support the faster data rates can not be supported on multi-drop busses, driving topologies to point-to-point busses.

The directional turn-around penalties on high speed busses with multiple transfers in flight tend to be too extreme, resulting in a transition from shared bidirectional busses to separate unidirectional busses. The power and area expense of the electrical I/O used to drive each unidirectional high speed bus interconnect wire has driven the transition from wide parallel busses to narrow serial busses. On a wide parallel bus, a transaction can be sent in one bus clock cycle across the interface. On a serial bus, the transaction is broken into packets and driven on the bus over multiple clock cycles. The packets are reassembled at the receiving end to form the original transaction.

As serial high speed unidirectional busses become more common in computer systems, techniques must be developed to make them more efficient and reliable. Also, when serial high speed unidirectional busses develop faults or are temporarily congested, data transfer rates can be impacted.

Therefore, there is a need for a high speed unidirectional interconnect that provides both higher reliability and higher efficiency than existing topologies

SUMMARY OF THE INVENTION

The disadvantages of the prior art are overcome by the present invention which, in one aspect, is a data communications apparatus that includes a central device and a plurality of communication devices. The central device includes a plurality of central port pairs, in which each central port pair includes an input port and an output port. The plurality of communication devices is arranged in a spoke and ring configuration, in which each communication device is part of a communication spoke. Each communication spoke is in communication with a different central port pair. Each communication device is also a part of a communication ring, so that each communication device in a selected communication ring belongs to a different communication spoke.

In another aspect, the invention is a data memory apparatus that includes a memory controller and a plurality of buffered random access memories. Each memory is part of a selected one of a plurality of communication spokes that is coupled to the memory controller. Each memory is also part of a selected one of a plurality of communication rings. The memories are coupled so that no two memories are part of both a common communication spoke and a common communication ring.

In yet another aspect, the invention is a method of coupling communication devices to a central device. Each communication device includes at least three device port pairs and in which each device port pair includes an input port and an output port. The central device includes a plurality of central port pairs, each central port pair including an input port and an output port. A plurality of communication spokes is formed by coupling an input port of a first adjacent communication device to an output port of a second adjacent communication device and by coupling an output port of the first adjacent communication device to an input port of the second adjacent communication device. Each spoke is coupled to a different input port-output port pair of a central device. A plurality of communication rings is formed by coupling each first communication device to a different second communication device that is not included in a spoke in which the first communication device is included. A system in which each of the communication devices decides which other communication device to send data to, based on predefined criteria, is applied for routing data from the central device to the communication devices.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1A:
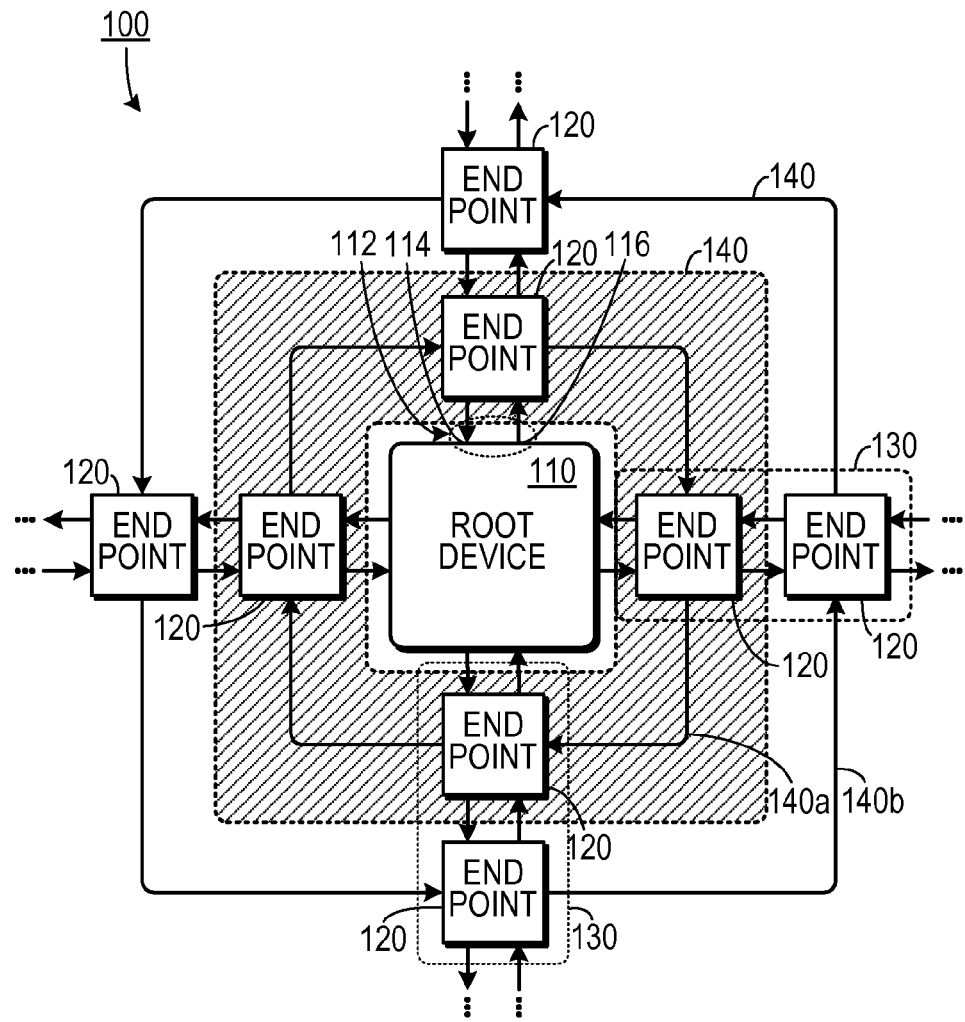
FIG. 1A is a schematic diagram of one embodiment.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

As shown in FIG. 1A, one embodiment is a data communications apparatus 100 that includes a central device 110 and a plurality of communication devices a plurality of communication devices 120. The central device 110 includes a plurality of central port pairs 112 (only one of which is pointed to in the figure for the sake of clarity) and each central port pair 112 include an input port 114 and an output port 116. Each of the communication devices 120 is arranged in a spoke and ring configuration in which each communication device 120 is part of a communication spoke 130 (only two of which are pointed to in the figure for the sake of clarity) and part of a communication ring 140. Each communication spoke 130 is in communication with a different central port pair 112 and each communication device 120 is also a part of a communication ring 140. Each communication device 120 in a communication ring 140 belongs to a different communication spoke 130.

Figure 1B:
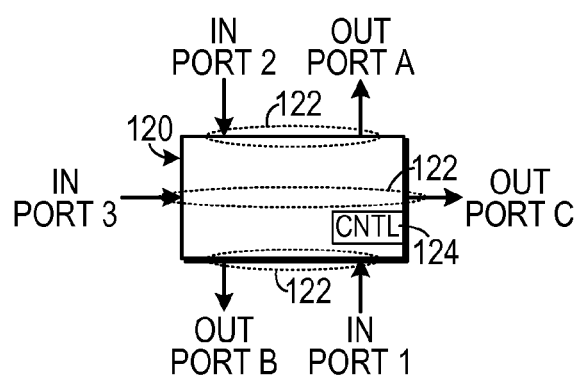
FIG. 1B is a schematic diagram of a communication device that may be used in the embodiment shown in FIG. 1A.

As shown in FIG. 1B, each of the communication devices 120 includes at least three device port pairs 122, each of which includes an input port and an output port.

Returning to FIG. 1A, each of the plurality of communication devices 120 is coupled to an adjacent communication device member of a common ring 140 such that an input port of each device 120 is coupled to an output port of an adjacent communication device 120 so that a first adjacent communication device 120 in the ring 140 transmits data directly to a second adjacent communication device 120 in the ring 140, but so that the first adjacent communication device 120 in the ring 140 does not receive data directly from the second adjacent communication device 120 in the ring 140. While the rings 140 can all rotate in the same direction, if the rings are counter rotating, then the redundant data paths between the communication devices 120 tend to be shorter. In such an embodiment, a first ring 140a can be coupled in a first rotating direction, where an adjacent second ring 140b can be coupled in a counter-rotating direction.

Returning to FIG. 1B, each of the communication devices 120 includes a control circuit 124 that selectively routes data to an adjacent communication device 120 on a common communication spoke or to an adjacent communication device 120 on a common communication ring, based on predefined criteria. The control circuit 124 in one embodiment employs detection of an interconnect failure and the rerouting of failed transactions. The detection of an interconnect fail is done at the link level—at the level of each transfer on each interconnect between each component. In this arrangement, when one component transmits a transaction across an interconnect to the next component in a spoke, a response is returned. The response is returned on the adjacent interconnect that goes in the opposite direction between the same two modules

| Destination | In Port 1 | In Port 2 | In Port 3 |
|---|---|---|---|
| Primary Port Out | A | B | C |
| Second Choice | C | C | A |
| Third Choice | B | A | B |

If a transaction queue for one of the out ports becomes full, the priority routing map can be dynamically modified for periods of high congestion. For example, using the simple prioritized port routing map above, if a transaction comes to In Port 1, it would be normally routed Out Port A if port A was functional. With congestion management, a transaction that comes In Port 1 would be routed Out Port C even if Out Port A was functional, but only if Out Port A's transaction queue was full.

Transaction routing could also be done based on address ranges. In this embodiment, each DRAM 220 would be assigned an address range by firmware at initialization. The address range for each DRAM 220 would be loaded into registers in each DRAM 220. The address range would cover the storage locations in that DRAM 220. Transactions are sent with the memory address of the transaction. The DRAM 220 would execute the transaction if the address contained in the transaction packet mapped to its address range. If the memory address contained in the transaction packet did not match the DRAM's address range, the transaction would be forwarded. The priority of the port out of which it is forwarded would be looked up in a table. The table would be initialized with address ranges in the top row instead of destination ID tags. The following is an example of such a table for the DRAM 220 with ID 000:

| | ID OF DEST. FROM TAG IN TRANSACTION | | | | | | |
|---|---|---|---|---|---|---|---|
| | ID = 001 | ID = 010 | ID = 011 | ID = 100 | ID = 101 | ID = 110 | ID = 111 |
| PRIMARY PORT OUT | A | C | C | C | C | A | A |
| SECOND CHOICE | C | A | A | A | A | B | B |
| THIRD CHOICE | B | B | B | B | B | C | C | involved in the transaction. If the response indicates a bad transmission of the transaction or no response is received in a set period of time, an alternate path is used.

Figure 2A:
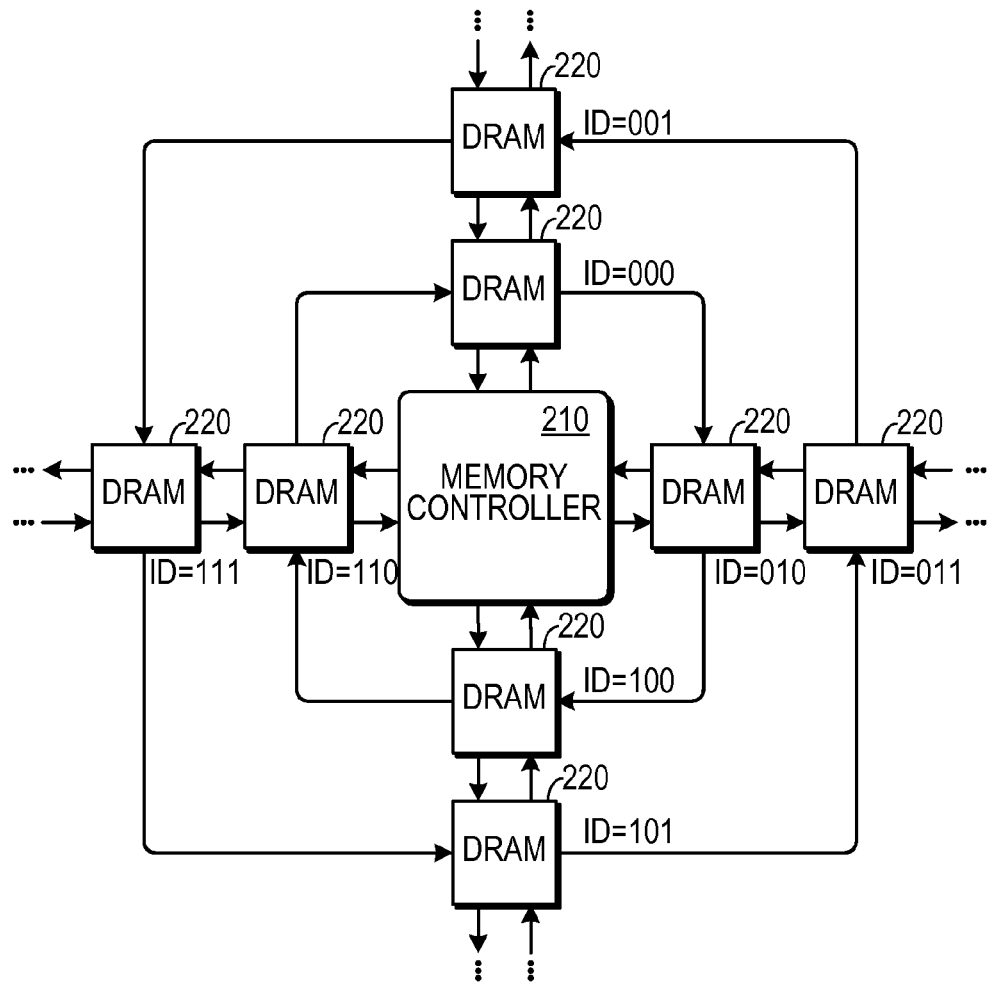
FIG. 2A is a schematic diagram of a memory topology according to the embodiment shown in FIG. 1A.
Figure 2B:
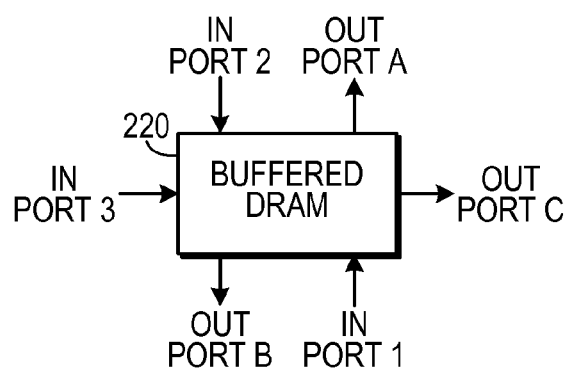
FIG. 2B is a schematic diagram of a buffered DRAM that may be used in the embodiment shown in FIG. 2A.

In one embodiment, as shown in FIGS. 2A and 2B, the central device is a memory controller 210 and each of the plurality of communication devices is a random access memory 220, such as a buffered DRAM.

One simple scheme for determining primary and alternate paths is destination-to-port mapping. At initialization, firmware explores the system topology and configures port mapping tables based on the topology it finds. Each DRAM in the topology is assigned an ID. The DRAM ID of the memory operation is included in a transaction packet. If the DRAM ID does not match the packet ID, the transaction packet is forwarded. If the DRAM ID matches the packet ID, the DRAM knows the transaction packet is for its local array. If the primary path fails, a secondary path is taken. If the secondary path fails, the next path in a priority table is chosen, if more than two paths exist. And so on, until all paths have been tried. The following table shows a forwarding hierarchy in accordance with this method:

The memory controller 210 could control all rerouting with no routing decisions done in the DRAMs 220, and with end-to-end retry at the path level. If the memory controller 210 did not get a response from the destination within a set period of time or a response was received indicating a bad interconnect, the memory controller would reissue the transaction using an alternate route.

The memory controller 210 would send routing information with the transaction. For example, the transaction could include information to go out port A on the first DRAM it travels through and port C on the second DRAM and then it is at the destination. On the return path, take port C on the first DRAM it travels through, port B at the second DRAM, and then it reaches the memory controller. There can be any number of levels of DRAMs that are traveled through and the number of levels to and from does not have to be equal.

This method of routing transactions by the memory controller 210 can be used to balance traffic and reduce congestion. If the memory controller 210 just sent several commands down the same path, it could send the next command down an alternate path, even if the path was longer, to reduce congestion.

While this embodiment uses memory interconnect as an example, the invention is not limited to memory interconnect. It may also apply, for example, to processor interconnect, I/O interconnect, storage interconnect, and any other application that supports redrive (daisy chaining) to add additional components. For memory interconnect, it may apply to the DRAM level or the traditional DIMM level (e.g., a Fully Buffered DIMM).

Figure 3:
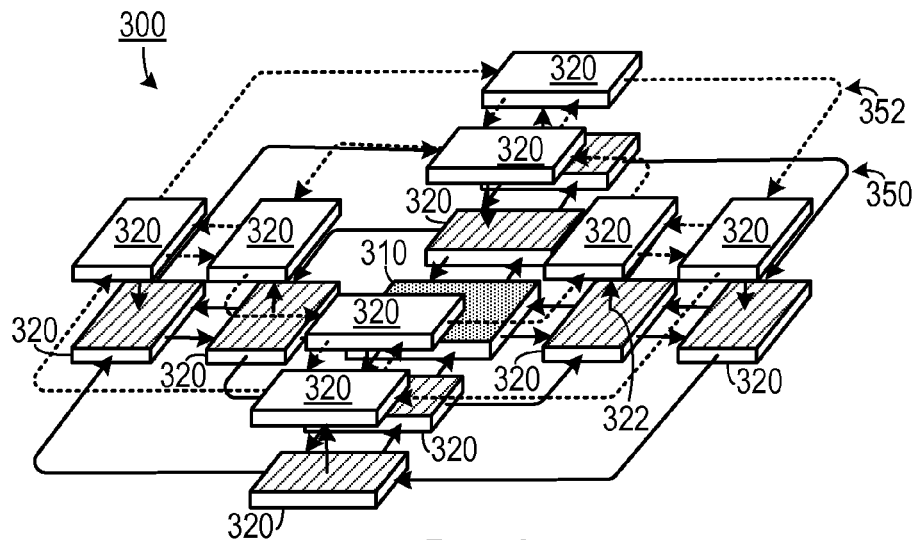
FIG. 3 is a schematic orthographic projection of a multi-dimensional embodiment.

One embodiment, as shown in FIG. 3 can use the principles described herein in a multi-layered configuration 300 this includes a first spoke and ring configuration 350 (that includes a central device 310) in communication with a second spoke and ring configuration 352. In this embodiment, each of the communication devices 320 includes a fourth device port pair 322 including an input port and an output port. The fourth device port pair 322 is used to facilitate communication between the communication devices 320 of the first spoke and ring configuration 350 and the second spoke and ring configuration 352

Figure 4:
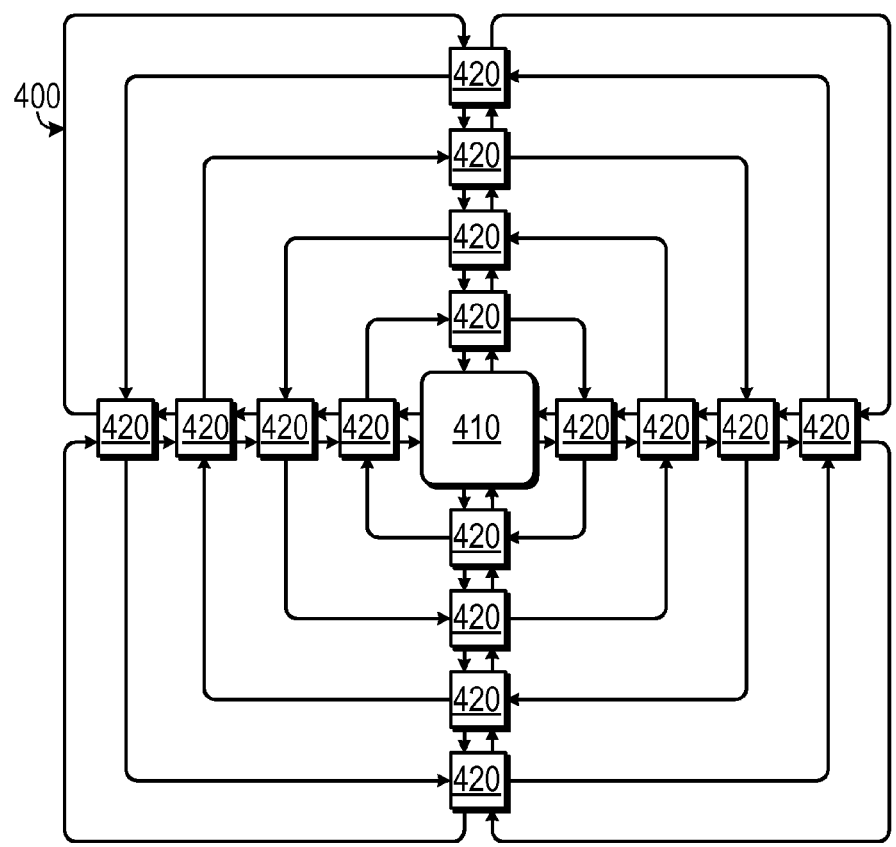
FIG. 4 is a schematic diagram of a four-deep embodiment.

While the above-described embodiments show spokes with only two communicating devices, it should be understood that the spokes can include more than just two devices. For example, as shown in FIG. 4, a communication interconnect 400 can employ a central device 410 and four, or more, communication devices 420 per spoke.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A data communications apparatus, comprising:
   a. a central device that includes a plurality of central port pairs, each central port pair including an input port and an output port; and
   b. a plurality of communication devices arranged in a spoke and ring configuration, in which each communication device is part of a communication spoke of a plurality of communication spokes, each communication spoke being in communication with a different central port pair, and in which each communication device is also a part of a communication ring of a plurality of communication rings, so that each communication device in a communication ring belongs to a different communication spoke,
   wherein each spoke includes more than one communication device and wherein each ring includes more than one communication device and wherein the spoke and ring configuration is configured so that data is transmitted in a first direction in a first ring of the plurality of rings and so that data is transmitted in a second direction, different from the first direction, in a second ring of the plurality of rings.

2. The data communications apparatus of claim 1, wherein each of the communication devices includes a control circuit that selectively routes data to an adjacent communication device on a common communication spoke or to an adjacent communication device on a common communication ring, based on predefined criteria.

3. The data communications apparatus of claim 1, wherein the central device comprises a memory controller.

4. The data communications apparatus of claim 1, wherein each of the plurality of communication devices comprises a random access memory.

5. The data communications apparatus of claim 4, wherein each random access memory comprises a DRAM.

6. The data communications apparatus of claim 1, wherein each of the communication devices includes at least three device port pairs, each device port pair including an input port and an output port.

7. The data communications apparatus of claim 6, wherein the communication devices included in each communication spoke are coupled in a sequence so that each communication device is in direct communication with a subsequent communication device.

8. The data communications apparatus of claim 7, wherein each of the plurality of communication devices is coupled to an adjacent communication device member of a spoke such that an input port of a first adjacent communication device in a first spoke is coupled to an output port of a second adjacent communication device in the first spoke and such that an output port of the first adjacent communication device in the first spoke is coupled to an input port of a second adjacent communication device in the first spoke, thereby forming a communication spoke.

9. The data communications apparatus of claim 8, wherein a at least one communication device is coupled to a selected one of the plurality of communication devices of a spoke and to a selected one of the central port pairs of the central device.

10. The data communications apparatus of claim 6, wherein the communication devices included in each communication ring of the plurality of communication rings are coupled in a sequence so that each communication device is in direct communication with a subsequent communication device.

11. The data communications apparatus of claim 10, wherein each of the plurality of communication devices is coupled to an adjacent communication device member of a ring such that an input port of each device of the plurality of communication devices is coupled to an output port of an adjacent communication device so that a first adjacent communication device in the ring transmits data directly to a second adjacent communication device in the ring, but so that the first adjacent communication device in the ring does not receive data directly from the second adjacent communication device in the ring.

12. The data communications apparatus of claim 6, wherein each of the communication devices further includes a fourth device port pair, each device port pair including an input port and an output port, wherein the apparatus further comprises a second spoke and ring configuration wherein selected communication devices of the second spoke and ring configuration are in communication with the first spoke and ring configuration.

13. A data memory apparatus, comprising:
   a. a memory controller; and
   b. a plurality of buffered random access memories, each memory of the plurality of buffered random access memories being a part of a selected one of a plurality of communication spokes that is coupled to the memory controller and each memory of the plurality of buffered random access memories being a part of a selected one of a plurality of communication rings, each memory of the plurality of buffered random access the memories coupled so that no two memories are part of both a common communication spoke and a common communication ring.

14. The data memory apparatus of claim 13, where the random access memories comprises a buffered DRAM.

15. The data memory apparatus of claim 13, wherein each of the random access memories includes a control circuit that selectively routes data to an adjacent random access memory that is on either a common communication spoke or on a common communication ring, based on predefined criteria.

16. A method of coupling a plurality of communication devices, in which each communication device includes at least three device port pairs, each device port pair including an input port and an output port, to a central device that includes a plurality of central port pairs, each central port pair including an input port and an output port, comprising the actions of:
 a. forming a plurality of communication spokes by coupling an input port of a first communication device of the plurality of communication devices to an output port of a second communication device that is adjacent to the first communication device and coupling an output port of the first communication device to an input port of the second communication device;
 b. coupling each spoke to a different input port-output port pair of a central device;
 c. forming a plurality of communication rings by coupling each communication device of the plurality of communication devices to a different communication device of the plurality of communication devices so that no two communication devices of the plurality of communication devices are both a common spoke and a common ring; and
 d. applying a system for routing data from the central device to the communication devices in which each of the communication devices decides which other communication device to send data to based on predefined criteria.

17. The method of claim 16, wherein the central device comprises a memory controller.

18. The method of claim 16, wherein each communication device comprises a buffered DRAM.

* * * * *